(12) United States Patent
Lee et al.

(10) Patent No.: US 12,438,193 B2
(45) Date of Patent: Oct. 7, 2025

(54) ELECTROLYTE SOLUTION FOR A LITHIUM SECONDARY BATTERY AND A LITHIUM SECONDARY BATTERY INCLUDING SAME

(71) Applicants: HYUNDAI MOTOR COMPANY, Seoul (KR); KIA CORPORATION, Seoul (KR); UNIST(ULSAN NATIONAL INSTITUTE OF SCIENCE AND TECHNOLOGY), Ulsan (KR)

(72) Inventors: Yoon Sung Lee, Suwon-si (KR); Jun Ki Rhee, Suwon-si (KR); Hui Beom Nam, Hwaseong-si (KR); Ko Eun Kim, Cheongju-si (KR); Sung Ho Ban, Hwaseong-si (KR); Sang Kyu Kwak, Ulsan (KR); Nam Soon Choi, Ulsan (KR); Sung You Hong, Ulsan (KR); Hyeong Jun Kim, Ulsan (KR); Seo Young Jeong, Ulsan (KR); Hyeon Gyu Moon, Ulsan (KR); Min Pyeong Kim, Ulsan (KR)

(73) Assignees: HYUNDAI MOTOR COMPANY, Seoul (KR); KIA CORPORATION, Seoul (KR); UNIST (ULSAN NATIONAL INSTITUTE OF SCIENCE AND TECHNOLOGY), Seoul (KR)

(*) Notice: Subject to any disclaimer, the term of this patent is extended or adjusted under 35 U.S.C. 154(b) by 532 days.

(21) Appl. No.: 17/988,998

(22) Filed: Nov. 17, 2022

(65) Prior Publication Data
US 2023/0402649 A1 Dec. 14, 2023

(30) Foreign Application Priority Data
Jun. 10, 2022 (KR) .................. 10-2022-0070868

(51) Int. Cl.
*H01M 10/0567* (2010.01)
*H01M 4/02* (2006.01)
(Continued)

(52) U.S. Cl.
CPC ....... *H01M 10/0567* (2013.01); *H01M 4/386* (2013.01); *H01M 4/583* (2013.01);
(Continued)

(58) Field of Classification Search
CPC ............................................. H01M 2300/0025
See application file for complete search history.

(56) References Cited

U.S. PATENT DOCUMENTS 9,318,777 B2  4/2016  Lim et al.
2013/0273426 A1  10/2013  Lim et al.
(Continued)

FOREIGN PATENT DOCUMENTS

CN  109659619 A  4/2019
JP  2010095473 A  4/2010
(Continued)

*Primary Examiner* — Barbara L Gilliam
*Assistant Examiner* — Jade Serena Simmons
(74) *Attorney, Agent, or Firm* — Lempia Summerfield Katz LLC (57) ABSTRACT

Disclosed herein are an electrolyte for a lithium secondary battery, which can enhance lifetime and output characteristics in a high-capacity lithium secondary battery, and a lithium secondary battery including the same. The electrolyte for a lithium secondary battery may include a lithium salt, a solvent, and a functional additive, wherein the functional additive includes 5,5-diallyl-3-(tert-butyldimethylsilyl)oxazolidin-2-one as a positive electrode film additive.

10 Claims, 4 Drawing Sheets

(51) Int. Cl.
*H01M 4/38* (2006.01)
*H01M 4/583* (2010.01)
*H01M 4/62* (2006.01)
*H01M 10/0568* (2010.01)
*H01M 10/0569* (2010.01)
*H01M 50/46* (2021.01)

(52) U.S. Cl.
CPC ....... *H01M 4/624* (2013.01); *H01M 10/0568* (2013.01); *H01M 10/0569* (2013.01); *H01M 50/46* (2021.01); *H01M 2004/027* (2013.01); *H01M 2004/028* (2013.01); *H01M 2300/0028* (2013.01)

(56) References Cited

U.S. PATENT DOCUMENTS

| | | | |
|---|---|---|---|
| 2014/0023941 A1* | 1/2014 | Amine | H01M 12/06 429/405 |
| 2016/0181661 A1 | 6/2016 | Dubois et al. | |
| 2021/0399343 A1 | 12/2021 | Song et al. | |

FOREIGN PATENT DOCUMENTS

| | | |
|---|---|---|
| KR | 101445602 B1 | 10/2014 |
| KR | 101897706 B1 | 9/2018 |
| KR | 20190092149 A | 8/2019 |
| KR | 102138128 B1 | 7/2020 |
| KR | 20200095190 A | 8/2020 |
| KR | 20200104655 A | 9/2020 |

* cited by examiner

ELECTROLYTE SOLUTION FOR A LITHIUM SECONDARY BATTERY AND A LITHIUM SECONDARY BATTERY INCLUDING SAME

CROSS-REFERENCE TO RELATED APPLICATION(S)

This application claims under 35 U.S.C. 119 the benefit of and the priority to Korean Patent Application No. 10-2022-0070868, filed on Jun. 10, 2022, in the Korean Intellectual Property Office, the disclosure of which is herein incorporated by reference in its entirety.

FIELD

The present disclosure relates to an electrolyte for a lithium secondary battery and a lithium secondary battery including the same. More specifically, the present disclosure relates to an electrolyte for a lithium secondary battery, which can enhance lifetime and output characteristics in a high-capacity lithium secondary battery, and a lithium secondary battery including the same.

BACKGROUND

The statements in this section merely provide background information related to the present disclosure and may not constitute prior art.

A lithium secondary battery is an energy storage system including a positive electrode for supplying lithium-ions upon charging, a negative electrode for receiving lithium-ions, an electrolyte serving as a lithium-ion transmission mediator, and a separator for separating the positive electrode and the negative electrode. Electric energy is generated and stored as chemical potentials change with intercalation/deintercalation in the positive and the negative electrode.

Such lithium secondary batteries have been used in mobile electronic devices and are now rapidly expanding their use as an energy storage system for electric vehicles (EVs) and hybrid electric vehicles (HEVs) that have been successfully commercialized therewith.

In order to increase driving ranges of EVs, studies have been focused on the increase of energy density in lithium secondary batteries. An improvement of high capacity in the positive electrode makes it possible to increase an energy density in a lithium secondary battery.

In order to develop a lithium secondary battery of high energy density, novel substances are desired that can overcome performance limits of conventional lithium secondary battery parts such as a positive electrode, a negative electrode, a separator, and an electrolyte.

Particularly, energy density in a battery depends on characteristics of the positive and the negative electrode. Accordingly, a suitable electrolyte should be developed in order that such developed positive and negative electrode substances exhibit excellent electrochemical performance.

When a lamella nickel (Ni)-rich $LiNi_{1-x-y}Co_xMn_yO_2$ (NCM; $1-x-y \geq 0.6$) oxide is used as a high-capacity positive electrode active material, the capacity of the positive electrode can be increased by increasing the content of Ni or by raising a charge voltage. However, the charge/discharge performance rapidly degrades because the residual lithium components ($Li_2CO_3$ and LiOH) present on the positive electrode promote degradation of the electrolyte and increase in interfacial reactivity with the electrolyte, thus accelerating the degeneration rate.

Therefore, positive electrode-electrolyte and interface control techniques are very important. In this context, introduction of an additive technique capable of forming an electrochemically and chemically stabile film is required.

The description in this Background section is provided only to understand the background of the present disclosure, but should not be recognized as a prior art already known to a person skilled in the art.

SUMMARY

The present disclosure provides an electrolyte for a lithium secondary battery, which can improve lifetime and output characteristics in a lithium secondary battery, and a lithium secondary battery including same.

An electrolyte for a lithium secondary battery according to an embodiment of the present disclosure includes a lithium salt, a solvent, and a functional additive. In particular, the functional additive includes 5,5-diallyl-3-(tert-butyldimethylsilyl)oxazolidin-2-one, represented by the following chemical formula 1, as a positive electrode film additive:

[Chemical Formula 1]

The positive electrode film additive may be used in an amount in a range of 0.1-1.0 wt. %, based on the weight of the electrolyte.

The positive electrode film additive may be used in an amount in a range of 0.3-0.5 wt. %, based on the weight of the electrolyte.

The functional additive may further include vinylene carbonate (VC) as a negative electrode film additive.

The vinylene carbonate (VC) is used in an amount in a range of 0.5-3.0 wt. %, based on the weight of the electrolyte.

The lithium salt may include $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $LiB(C_2O_4)_2$, $LiPO_2F_2$, $Li(SO_2F)_2N$, (LiFSI), $(CF_3SO_2)_2NLi$, or a combination thereof.

The solvent may include a carbonate-based solvent, an ester-based solvent, an ether-based solvent, a ketone-based solvent, or a combination thereof.

A lithium secondary battery according to an embodiment of the present disclosure includes the electrolyte described above. The lithium secondary battery may further include a positive electrode containing a positive electrode active material composed of Ni, Co, and Mn; a negative electrode containing at least one negative electrode active material selected from a carbon (C)-based material and silicon (Si)-based material; and a separator interposed between the positive electrode and the negative electrode.

The positive electrode may contain Ni at a content of 80 wt. % or more.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Hereinafter, embodiments of the present disclosure will be described in detail in conjunction with the accompanying drawings. However, the present disclosure is not limited to embodiments that will be disclosed below and may be implemented in various different forms. These embodiments are merely provided to make the disclosure of the present disclosure complete and to enable those having ordinary knowledge in the art to which the present disclosure pertains completely understand the scope of the present disclosure.

An electrolyte for a lithium secondary battery according to an embodiment of the present disclosure includes a lithium salt, a solvent, and a functional additive.

The lithium salt may include $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $LiB(C_2O_4)_2$, $LiPO_2F_2$, $Li(SO_2F)_2N$, (LiFSI), $(CF_3SO_2)_2NLi$, or a combination thereof.

In one embodiment, the lithium salt may exist at a total concentration in a range of 0.1-3.0 moles or in a range of 0.1-1.2 moles in the electrolyte.

The solvent may include a carbonate-based solvent, an ester-based solvent, an ether-based solvent, a ketone-based solvent, or a combination thereof.

In this regard, examples of the carbonate-based solvent include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), fluoroethylene carbonate (FEC), and vinylene carbonate (VC). The ester-based solvent may be exemplified by γ-butyrolactone (GBL), n-methyl acetate, n-ethyl acetate, n-propyl acetate, etc. As the ether-based solvent, dibutyl ether may be used, but without limitations thereto.

In addition, the solvent may further include an aromatic hydrocarbonate solvent. Examples of the aromatic carbohydrate solvent include benzene, fluorobenzene, bromobenzene, chlorobenzene, cyclohexyl benzene, isopropyl benzene, n-butylbenzene, octyl benzene, toluene, xylene, and mesitylene, which may be used alone or in combination.

The functional additive used in the electrolyte according to an embodiment of the present disclosure may employ 5,5-diallyl-3-(tert-butyldimethylsilyl)oxazolidin-2-one (hereinafter, referred to as "HN-001"), represented by the following chemical formula 1, as a positive electrode film additive:

[Chemical Formula 1]

Having low LUMO and high HOMO energy levels as calculated by DFT for comparison of HOMO and LUMO orbital energy levels, the positive electrode film additive which is 5,5-diallyl-3-(tert-butyldimethylsilyl)oxazolidin-2-one (HN-001) is first degraded on the surfaces of positive and negative electrodes to form CEI and SEI layers.

Thus, the positive electrode film additive HN-001 can undergo radical polymerization through an electrochemical reaction due to the terminal vinyl double bond thereof to form a polymeric film. The stable and uniform film, which is formed on the surface of the electrode, blocks the direct contact of other solvents with the electrode and thus prevents the degradation attributed to the direct contact, with the consequent reduction of unnecessary adverse reactions.

Including the polymeric component, the film has physical flexibility sufficient to surmount the problems, raised for silicon-containing negative electrodes, including the film structure destruction caused by severe volume expansion and contraction and the gradual thickening of the film according to the resulting exposure of the active surface.

In addition, the positive electrode film additive HN-001 scavenges the acidic component hydrogen fluoride (HF), which acts as an aging factor in an electrolyte, and does not form trimethylsilyl fluoride (TMSF), which is a volatile material.

In other words, most commercialized lithium-ion batteries employ electrolytes based on the lithium salt $LiPF_6$ which is for use in general purposes. However, the lithium salt $LiPF_6$ is fatally vulnerable to moisture and undergoes hydrolysis in the presence of even a trace amount of moisture to form gradually produce HF.

HF, when formed in lithium-ion batteries, attacks and degrades the solvent of the electrolyte and reacts with the alkali component $Li_2CO_3$ in the electrode-electrolyte interphase to form LiF. Accordingly, gas occurs with the exposure of the active surface.

The silicon element in the functional group amino silane (Si—N) is known to have very strong affinity for fluorine and is frequently used as a scavenger of HF in lithium-ion batteries. Among others, the functional group trimethylsilyl (TMS) may be used as a scavenger. With the low boiling point (16° C.), the TMSF formed after removal of HF may cause the problem of gas generation.

As opposed, the positive electrode film additive 5,5-diallyl-3-(tert-butyldimethylsilyl)oxazolidin-2-one (HN-001) according to the present disclosure functions as a scavenger and has the tert-butyldimethyl silyl structure from which tert-butyldimethyl silyl fluoride with a high boiling point (90° C.) is formed after removal of HF, causing no problems with gas generation.

Figure 1:
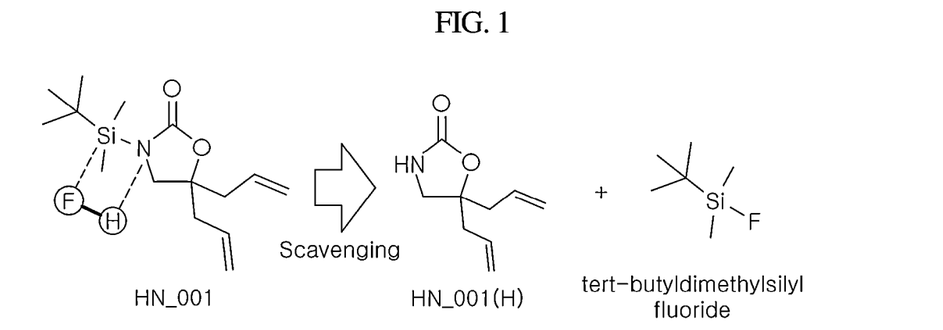
FIG. 1 is a reaction scheme for scavenging HF with a positive electrode film additive according to an embodiment of the present disclosure.

FIG. 1 is a reaction scheme illustrating the scavenging of HF with the positive electrode film additive (HN-001) according to an embodiment of the present disclosure, wherein the silicon (Si) element in the functional group amino silane (Si—N) of the positive electrode film additive (HN-001) scavenges fluorine (F) while hydrogen (H) is removed by nitrogen (N).

The positive electrode film additive may be added in an amount in a range of 0.1-1.0 wt. % or 0.3-0.5 wt. %, based on the total weight of the electrolyte.

When added in an amount less than 0.1 wt. %, the positive electrode film additive contributes only little effect because the additive cannot sufficiently form a surface protecting film on the surface of the positive electrode active material and the negative electrode active material. When the positive electrode film additive is more than 1.0 wt. %, the positive electrode film additive causes the excessive formation of the surface protecting layers CEI and SEI, increasing a cell resistance, which results in a decreased lifetime.

The functional additive may further include a negative electrode film additive functioning to form a film on a negative electrode in addition to the positive electrode film additive. For example, vinylene carbonate (hereinafter referred to "VC") may be used as the additional negative electrode film additive.

In one embodiment, VC, used as a negative electrode film additive, may be added in an amount in a range of 0.5-3.0 wt. %, based on the weight of the electrolyte. In another embodiment, the negative electrode film additive may be added in an amount in a range of 1.5-2.5 wt. %.

Less than the lower limit of the negative electrode film additive reduces long-term lifetime characteristics of the cell. When exceeding the upper limit, the amount of the negative electrode film additive excessively forms a surface protecting layer and causes an increase in cell resistance, with the resultant decrease of battery output.

According to an embodiment thereof, the present disclosure provides a lithium secondary battery including the electrolyte described above, a positive electrode, a negative electrode, and a separator.

The positive electrode includes an NCM-based positive electrode active material composed of Ni, Co, and Mn. Particularly, the positive electrode active material in the positive electrode according to an embodiment is composed only of an NCM-based positive electrode active material containing 80 wt. % or more of Ni.

The negative electrode includes a carbon (C)-based negative electrode active material, a silicon (Si)-based negative electrode active material, or a combination thereof.

The carbon (C)-based negative electrode active material may include artificial graphite, natural graphite, graphitized carbon fibers, graphitized mesocarbon microbeads, fullerene, amorphous carbon, or a combination thereof.

The silicon (Si)-based negative electrode active material may include a silicon oxide, a silicon particle, and a silicon alloy particle.

For the positive electrode and the negative electrode, the corresponding active material is mixed with a conductive material, a binder, and a solvent to prepare an electrode slurry. This electrode slurry is applied directly on a current collector and dried to manufacture the positive electrode or the negative electrode. In this regard, the current collector may be formed of aluminum (Al), but with no limitations thereto. Such electrode manufacturing methods are well known in the art and thus a detailed description is not given thereof.

The binder acts to well aggregate active material particles each other or strongly attach them to a current collector. Examples of the binder include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, ethylene oxide-bearing polymers, polyvinyl pyrrolidone, polyurethane, polytetrafluoroethylene, polyvinylidene fluoride, polyethylene, polypropylene, styrene butadiene rubber, acrylated styrene butadiene rubber, an epoxy resin, and nylon.

The conductive material is used to confer conductivity on the electrodes. So long as it is of electron conductivity without causing a chemical change in the battery, any conductive material is available. Examples of the conductive material include natural graphite, artificial graphite, carbon black, acetylene black, Ketjenblack, carbon fibers, and metal powders or fibers such as copper, nickel, aluminum, silver, etc., and metallic fibers. In addition, at least one conductive material such as a polyphenylene derivative may be further used.

The separator prevents the formation of a short circuit between the positive electrode and the negative electrode while providing migration channels of lithium ions. This separator may well-known one, for example, a polyolefinic membrane such as polypropylene, polyethylene, polyethylene/polypropylene, polyethylene/polypropylene/polyethylene, polypropylene/polyethylene/polypropylene, etc., or a multiple membrane, microporous film, woven fabric, or non-woven fabric thereof. Alternatively, a porous polyolefin film coated with highly stable resin may be used.

Hereinafter, the present disclosure is explained with reference to Examples and Comparative Examples.

<Test 1> Test for Initial Cell Efficiency (Discharge/Charge) and High-Temperature Lifetime Characteristic at High Temperature (45° C.) According to Amount of Positive Electrode Film Additive Upon Use of Graphite as Negative Electrode To examine initial cell efficiency and high-temperature lifetime characteristics according to the presence and absence of the positive electrode film additive in the electrolyte and the amount of the positive electrode film additive, if present, upon the use of graphite as the negative electrode, a measurement was made of initial cell efficiency and discharge retention after 100 cycles at a high temperature (45° C.) while the amount of the positive electrode film additive HN-001 was changed as shown in Table 1, below, with the amount of the negative electrode film additive VC fixed at 1.0 wt. %. The results are summarized in Table 1 and depicted in FIGS. 2 and 3.

In this regard, the cycles were performed under the conditions of cut-off: 2.5-4.2 V, C-rate 1 C, and temperature: 45° C. For preparing electrolytes, 0.5M $LiPF_6$+0.5 LiFSI was used as a lithium salt and a mixture of ethylene carbonate (EC):ethylmethyl carbonate (EMC):diethyl carbonate (DEC) at a volume ratio of 25:45:30 as a solvent.

The positive electrode was made of NCM811 while the negative electrode was a graphite electrode.

TABLE 1

| | Additive | | | Cell Initial Efficiency (%) | Lifetime at high temp. |
|---|---|---|---|---|---|
| | VC | $LiPO_2F_2$ | HN-001 | (charge/discharge) | (%)@100 cyc |
| C. Ex. 1 | 1.0 | — | — | 87.9 | 88.9 |
| C. Ex. 2 | 1.0 | 0.5 | — | 90.3 | 90.8 |
| Ex. 1 | 1.0 | — | 0.1 | 90.2 | 90.7 |
| Ex. 2 | 1.0 | — | 0.3 | 91.0 | 90.8 |
| Ex. 3 | 1.0 | — | 0.5 | 91.2 | 91.0 |
| Ex. 4 | 1.0 | — | 1.0 | 90.4 | 90.4 |

Figure 2:
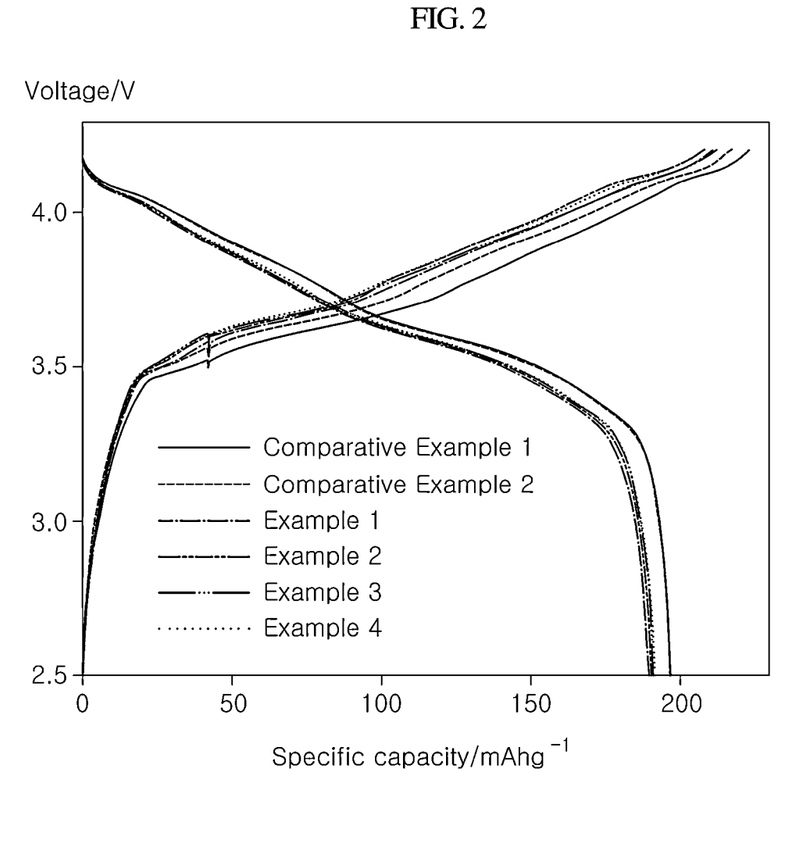
FIG. 2 shows curves of cell initial charge/discharge efficiencies according to electrolyte compositions of the Examples and Comparative Examples.
Figure 3:
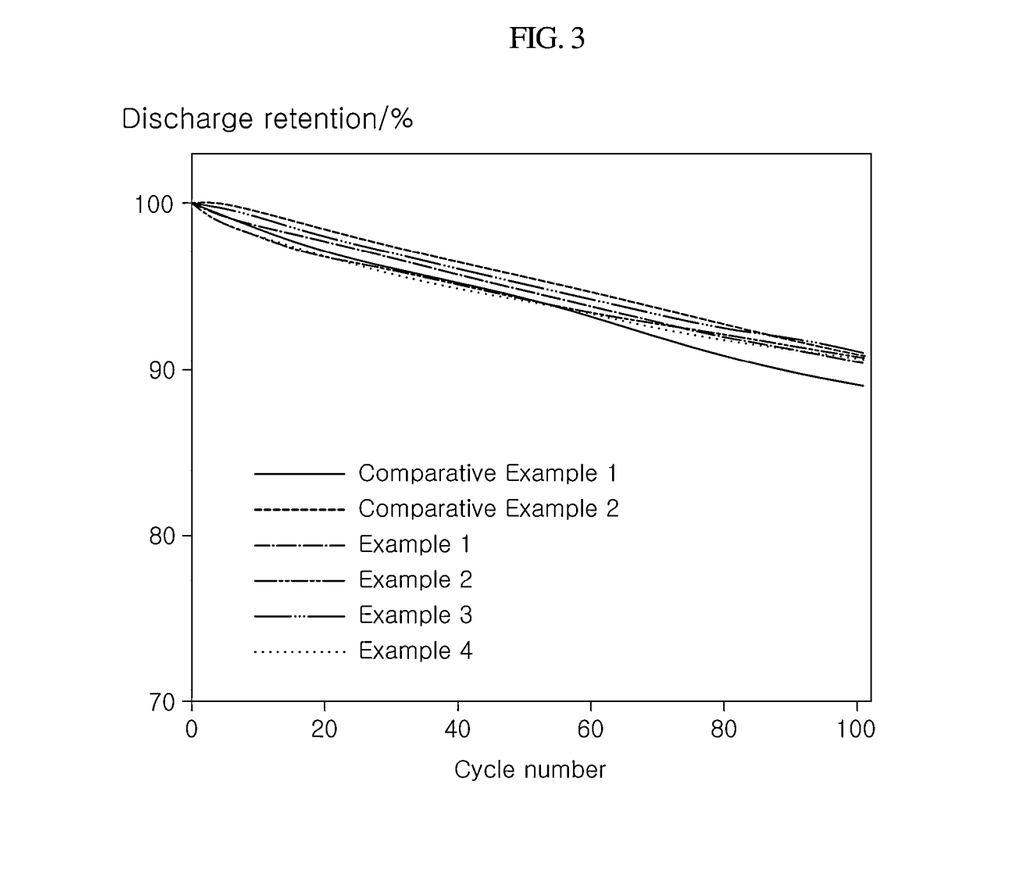
FIG. 3 shows curves of high-temperature lifetimes according to electrolyte compositions of the Examples and Comparative Examples.

FIG. 2 shows curves of cell initial charge/discharge efficiencies according to electrolyte compositions of the Examples and Comparative Examples. FIG. 3 shows curves of high-temperature lifetimes according to electrolyte compositions of the Examples and Comparative Examples.

As shown in Table 1 and FIGS. 2 and 3, the initial cell efficiency was improved in all Examples 1 to 4 in which the positive electrode film additive (HN-001) was added in amounts of 0.1 wt. %, 0.3 wt. %, 0.5 wt. %, and 1.0 wt. %, respectively, compared to Comparative Example 1 where the positive electrode film additive was not added to the electrolyte.

In addition, the cell initial efficiencies were similar to or higher than that of Comparative Example 2 where $LiPO_2F_2$ was used as a negative electrode film additive in an amount of 0.5 wt. %.

In terms of high-temperature lifetime, an improvement was brought about in all Examples 1 to 4, compared to Comparative Example 1.

The high-temperature lifetime characteristics were similar to or greater than that of Comparative Example 2.

Particularly, the cell initial efficiency was significantly improved in Examples 2 and 3, compared to Comparative Examples 1 and 2.

A significant improvement was brought about in the high-temperature lifetime characteristic of Example 3, compared to Comparative Examples 1 and 2.

<Test 2> Test for Rate Capability at Room Temperature(25° C.) According to Amount of Positive Electrode Film Additive Upon Use of Graphite as Negative Electrode To examine rate capability at room temperature (25° C.) according to the presence and absence of the positive electrode film additive in the electrolyte and the amount of the positive electrode film additive, if present, upon the use of graphite as the negative electrode, a measurement was made of rate capability at room temperature (25° C.) while the amount of the positive electrode film additive HN-001 was changed as shown in Table 2, below, with the amount of the negative electrode film additive VC fixed at 1.0 wt. %. The results are summarized in Table 2 and depicted in FIG. 4.

In this regard, the cycles were performed under the conditions of cut-off: 2.5-4.2 V, C-rate 0.5 C/1.0 C/2.0 C/3.0 C/0.5 C, and temperature: 25° C. For preparing electrolytes, 0.5M $LiPF_6$+0.5 LiFSI was used as a lithium salt and a mixture of ethylene carbonate (EC):ethylmethyl carbonate (EMC):diethyl carbonate (DEC) at a volume ratio of 25:45:30 as a solvent.

The positive electrode was made of NCM811 while the negative electrode was a graphite electrode.

TABLE 2

|  | Additive | | | Rate Capability |
|---|---|---|---|---|
|  | VC | $LiPO_2F_2$ | HN-001 | @3 C |
| C. Ex. 1 | 1.0 | — | — | 72.9 |
| C. Ex. 2 | 1.0 | 0.5 | — | 76.3 |
| Ex. 1 | 1.0 | — | 0.1 | 76.9 |
| Ex. 2 | 1.0 | — | 0.3 | 77.1 |
| Ex. 3 | 1.0 | — | 0.5 | 77.4 |
| Ex. 4 | 1.0 | — | 1.0 | 76.3 |

Figure 4:
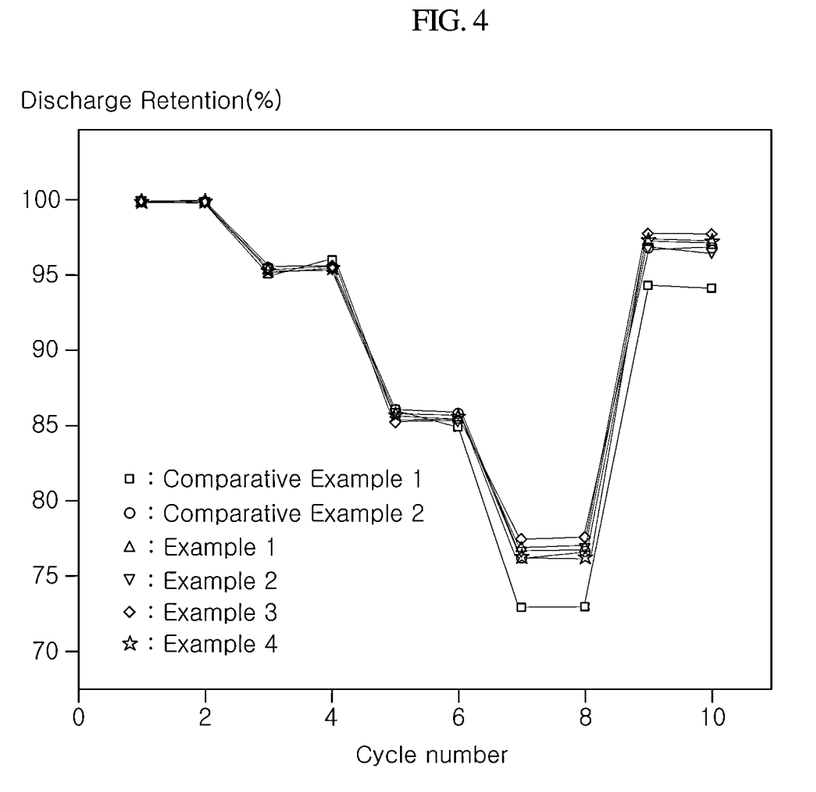
FIG. 4 is a plot of rate capability according to electrolyte compositions of the Examples and Comparative Examples.

FIG. 4 is a plot of rate capability according to electrolyte compositions of the Examples and Comparative Examples.

As shown in Table 2 and FIG. 4, the rate capability was improved in all Examples 1 to 4 in which the positive electrode film additive (HN-001) was added in amounts of 0.1 wt. %, 0.3 wt. %, 0.5 wt. %, and 1.0 wt. %, respectively, compared to Comparative Example 1 where the positive electrode film additive was not added to the electrolyte.

In addition, the rate capability was similar to or higher than that of Comparative Example 2 where $LiPO_2F_2$ was used as a negative electrode film additive in an amount of 0.5 wt. %.

Particularly, Examples 2 and 3 exhibited significantly improved rate capability, compared to Comparative Examples 1 and 2.

Therefore, as can be understood from the data of the tests, the initial cell efficiency, high-temperature lifetime, and rate capability characteristics were improved upon the addition of the positive electrode film additive (HN-001) of the present disclosure in an amount of 0.1-1.0 wt. % and more in an amount of 0.3-0.5 wt. %, compared to the absence of the positive electrode film additive (HN-001) of the present disclosure.

As described hitherto, according to embodiments of the present disclosure, the electrolyte can form a highly ion-conductive, protective film on the surface of a positive electrode active material to prevent the degradation of the cell, thereby extending the lifetime of the lithium secondary battery and enhancing output characteristics thereof.

Furthermore, the electrolyte guarantees lifetime stability at high temperatures, contributing to an improvement of commercial value in the battery.

It will be appreciated by those having ordinary knowledge in the art to which the present disclosure pertains that the present disclosure may be practiced in other specific forms without changing the technical spirit and essential features of the present disclosure. Therefore, it should be understood that the above-described embodiments are illustrative but not restrictive in all aspects. The scope of the present disclosure is defined by the scope of the attached claims, rather than the detailed description. It should be appreciated that all variations and modifications derived from the scope of the claims and the equivalent concepts thereof are included in the scope of the present disclosure.

What is claimed is:

1. An electrolyte for a lithium secondary battery, the electrolyte comprising:
    a lithium salt;
    a solvent; and
    a functional additive comprising 5,5-diallyl-3-(tert-butyldimethylsilyl)oxazolidin-2-one represented by the following chemical formula as a positive electrode film additive:

2. The electrolyte of claim 1, wherein the positive electrode film additive is in a range of 0.1-1.0 wt. %, based on a weight of the electrolyte.

3. The electrolyte of claim 1, wherein the positive electrode film additive is in a range of 0.3-0.5 wt. %, based on a weight of the electrolyte.

4. The electrolyte of claim 1, wherein the functional additive further comprises vinylene carbonate (VC) as a negative electrode film additive.

5. The electrolyte of claim 4, wherein the vinylene carbonate (VC) is in a range of 0.5-3.0 wt. %, based on a weight of the electrolyte.

6. The electrolyte of claim 1, wherein the lithium salt comprises $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $LiB(C_2O_4)_2$, $LiPO_2F_2$, $Li(SO_2F)_2N$, (LiFSI), $(CF_3SO_2)_2NLi$, or a combination thereof.

7. The electrolyte of claim 1, wherein the solvent comprises a carbonate-based solvent, an ester-based solvent, an ether-based solvent, a ketone-based solvent, or a combination thereof.

8. A lithium secondary battery comprising:
an electrolyte having a lithium salt, a solvent, and a functional additive, wherein the functional additive comprises 5,5-diallyl-3-(tert-butyldimethylsilyl)oxazolidin-2-one represented by the following chemical formula as a positive electrode film additive:

9. The lithium secondary battery of claim 8, further comprising:
a positive electrode containing a positive electrode active material comprising Ni, Co, and Mn;
a negative electrode containing at least one negative electrode active material comprising a carbon (C)-based material, a silicon (Si)-based material, or a combination thereof; and
a separator interposed between the positive electrode and the negative electrode.

10. The lithium secondary battery of claim 9, wherein the positive electrode comprises 80 wt. % or more of Ni.

* * * * *